(12) United States Patent
Hanson et al.

(10) Patent No.: US 10,056,840 B1
(45) Date of Patent: Aug. 21, 2018

(54) FEED-REFERENCED REGENERATIVE DC LOAD

(71) Applicant: Hamilton Sundstrand Corporation, Charlotte, NC (US)

(72) Inventors: Michael J. Hanson, Rockford, IL (US); Daniel Knope, Rockton, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/833,707

(22) Filed: Dec. 6, 2017

(51) Int. Cl.
*G05F 1/44* (2006.01)
*H02M 3/158* (2006.01)

(52) U.S. Cl.
CPC .................................. *H02M 3/158* (2013.01)

(58) Field of Classification Search
CPC ......... H02M 1/4208; H02M 2001/007; H02M 3/158; G05F 1/613; Y02B 70/126
USPC ................ 323/224, 235, 265–267, 271–273, 323/282–289, 299; 363/16–20, 89, 125
See application file for complete search history.

(56) References Cited

U.S. PATENT DOCUMENTS

| | | | | |
|---|---|---|---|---|
| 5,134,355 A | * | 7/1992 | Hastings | H02M 1/4208 323/211 |
| 5,642,267 A | * | 6/1997 | Brkovic | G05F 1/613 323/224 |
| 6,232,964 B1 | * | 5/2001 | Lee | G09G 1/16 345/211 |
| 6,775,160 B2 | | 8/2004 | Siri | |
| 8,022,683 B2 | * | 9/2011 | Thompson | H02M 3/158 323/284 |
| 8,604,822 B2 | | 12/2013 | Schroeder et al. | |
| 2006/0132106 A1 | * | 6/2006 | Lucas | G01R 31/2879 323/267 |
| 2008/0186741 A1 | | 8/2008 | Rabo | |

* cited by examiner

*Primary Examiner* — Rajnikant Patel
(74) *Attorney, Agent, or Firm* — Kinney & Lange, P.A.

(57) ABSTRACT

A regenerative direct current (DC) load includes an input circuit, an output circuit, a low pass filter circuit, and a current regulating circuit. The input circuit is configured to receive electrical power. The output circuit is configured to provide electrical power. The low pass filter circuit is electrically coupled to the output in series. The current regulating circuit is configured to regulate a current of the electrical power. The current regulating circuit is electrically coupled to the input. The current regulating circuit includes a first switch, and a first control circuit. The first switch is electrically coupled between the input circuit and ground. The first control circuit is configured to sense the current and adjust a cycle duration and/or duty cycle of the first switch based upon the sensed current.

20 Claims, 4 Drawing Sheets

US 10,056,840 B1

FEED-REFERENCED REGENERATIVE DC LOAD

BACKGROUND

Load banks are an integral part of a test environment for power generation and distribution products. The primary outputs of a power distribution product are the power feeds for other downstream equipment. Load Banks are used to test distribution equipment by simulating the downstream utilization equipment. Load banks are composed of multiple loads to simulate the many loads the power generation and distribution products will supply power to. Load banks dissipate significant amounts of heat from the test environment, and require substantial amounts of input energy available to the test environment.

To properly test the capacity of the unit under test, the load bank should represent that load characteristics that will be observed by the unit under test while in service. The energy delivered to a load bank is dissipated, as heat, back into the environment. A unit under test with many outputs can distribute tens-of-kilowatts of power or more. This power is wasted in several ways. Unless the unit under test is distributing AC utility power from the "mains", the capacity of the source, or feed, power source must be large. The losses from this source can be large. The energy delivered to the loads is wasted as heat. A facility containing the test facilities may be air-conditioned. Pumping this wasted heat out of the building to cool the facility will waste additional energy.

SUMMARY

In one example, a regenerative direct current (DC) load comprises an input circuit, an output circuit, a low pass filter circuit, a current regulating circuit, and a link voltage regulating circuit. The input circuit is configured to receive electrical power. The output circuit is configured to provide electrical power. The low pass filter circuit is electrically coupled to the output in series. The current regulating circuit is configured to regulate a current of the electrical power. The current regulating circuit is electrically coupled to the input. The current regulating circuit comprises a first switch, and a first control circuit. The first switch is electrically coupled between the input circuit and ground. The first control circuit is configured to sense the current and adjust a cycle duration and/or duty cycle of the first switch based upon the sensed current. The link voltage regulating circuit is electrically coupled in series between the current regulating circuit and the low pass filter circuit. The link voltage regulating circuit is configured to regulate a voltage received from the current regulating circuit. The link voltage regulating circuit comprises a second switch and a second control circuit. The second switch is electrically coupled in series between the current regulating circuit and the low pass filter circuit. The second control circuit is configured to sense the voltage received from the current regulating circuit and adjust a cycle duration and/or duty cycle of the second switch based upon the sensed voltage.

In one example, a system for regenerating power while testing a power distribution device comprises a power distribution device, a power supply, and a regenerative DC load. The power supply is electrically coupled to the power distribution device. The power supply is configured to provide power to the power distribution device. The regenerative DC load is electrically coupled to the power distribution device. The regenerative DC load is configured to act as a load to the power distribution device and feed at least a portion of the power provided by the power distribution device back to the power distribution device. The regenerative DC load comprises an input circuit, an output circuit, a low pass filter circuit, and a current regulating circuit. The input circuit is configured to receive electrical power. The output circuit is configured to provide electrical power. The low pass filter circuit is electrically coupled to the output in series. The current regulating circuit electrically coupled to the input circuit. The current regulating circuit comprises a first switch and a first control circuit. The first switch is electrically coupled between the input circuit and ground. The first control circuit is configured to sense the current and adjust a cycle duration and/or duty cycle of the first switch based upon the sensed current.

In one example, a method for regenerating power while simulating a load of a power distribution device comprises receiving electrical power at a voltage from a power distribution device; regulating, in response to receiving electrical power, the current of the electrical power received using a current regulating circuit, regulating the current comprises sensing the current using a first control circuit, the first control circuit part of the current regulating circuit; adjusting, in response to the sensed current, a first switch cycle duration and/or duty cycle using the first control circuit; regulating, in response to the regulated current, an output voltage of the current regulating circuit using a link voltage regulating circuit, regulating the output voltage comprises sensing the output voltage using a second control circuit, the second control circuit part of the link voltage regulating circuit; adjusting, in response to the sensed voltage, a second switch cycle duration and/or duty cycle using the second control circuit; and providing a regulated current to the power distribution device.

DETAILED DESCRIPTION

Apparatus, systems, and associated methods relate to regenerating power provided by a power distribution device using a regenerative DC load. Using the apparatus, systems, and associated methods herein, allows for power generation and distribution products to be tested without wasting all of the power provided by power generation and distribution products using a passive load. Additionally, smaller power supplies can be utilized because regenerated power is fed back to the power generation and distribution products under test.

Figure 1:
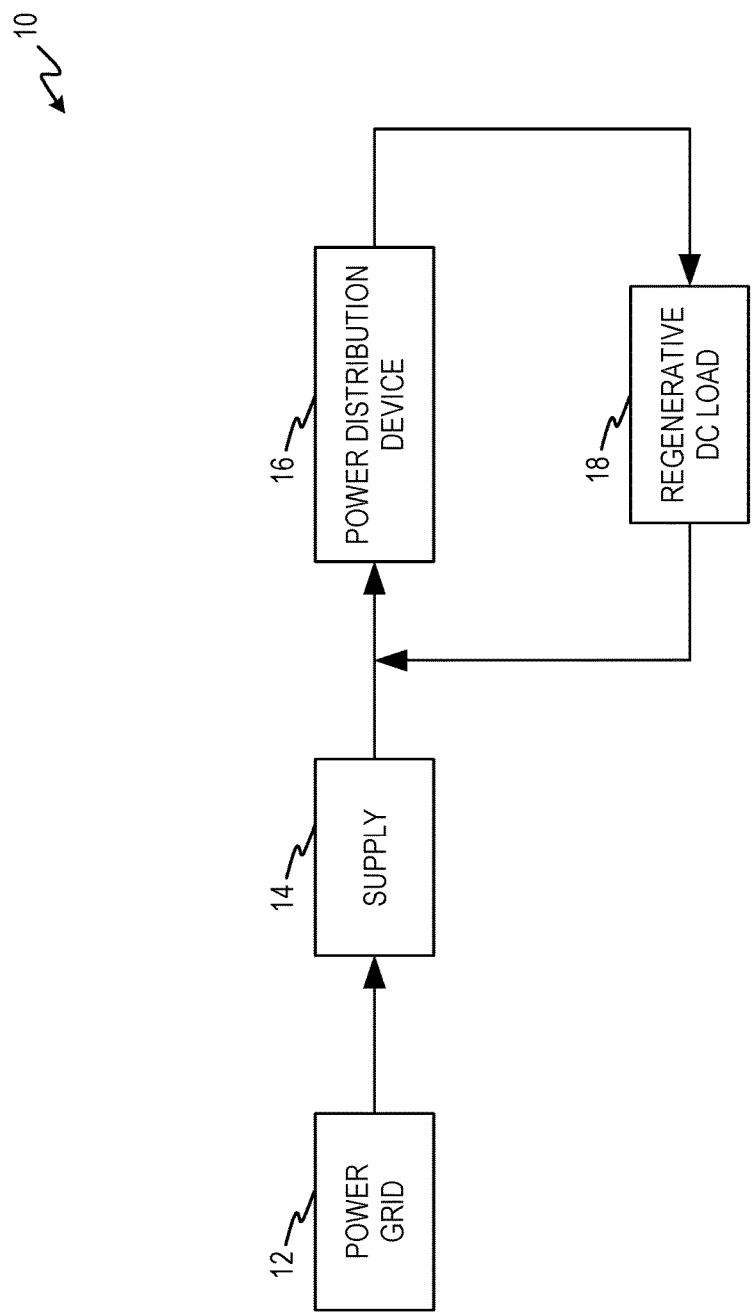
FIG. 1 is a block diagram of a test system for a power distribution device using a regenerative direct current (DC) load.

FIG. 1 is a block diagram of test system 10 including power grid 12, supply 14, power distribution device 16, and regenerative DC load 18.

Supply 14 receives power from power grid 12 and conditions the power for power distribution device 16. Power grid 12 can be any local utility power grid or local generator that supplies alternating current (AC) power. Some examples of AC power supplied by local utility power grids include 230 V at 50 Hz such as in Europe, or 120 V at 60 Hz such as in the United States. Supply 14 is configured to receive AC power from power grid 12 and convert it to DC power for power distribution device 16. In one example, supply 14 is configured to convert the AC power to DC power usable in aircraft electrical systems. Aircraft electrical systems can operate at 24 V, 28 V, and/or 270 V.

Power distribution device 16 stores and distributes power to multiple loads. To test the capacity and capabilities of power distribution device 16, regenerative DC load 18 is used. Regenerative DC load 18 simulates load conditions that may be experienced by power distribution device 16 during actual use. Unlike a passive DC load, regenerative DC load 18 regenerates, or returns at least a portion of the power provided by power distribution device 16 back to power distribution device 16. In one example, regenerative DC load 18 regenerates 90% of the power provided by power distribution device 16. By providing the power back to power distribution device 16, supply 14 does not need to provide as much power, allowing supply 14 to be of a smaller capacity than needed for a passive load, or a regenerative load that provides power back to power grid 12.

Figure 2:
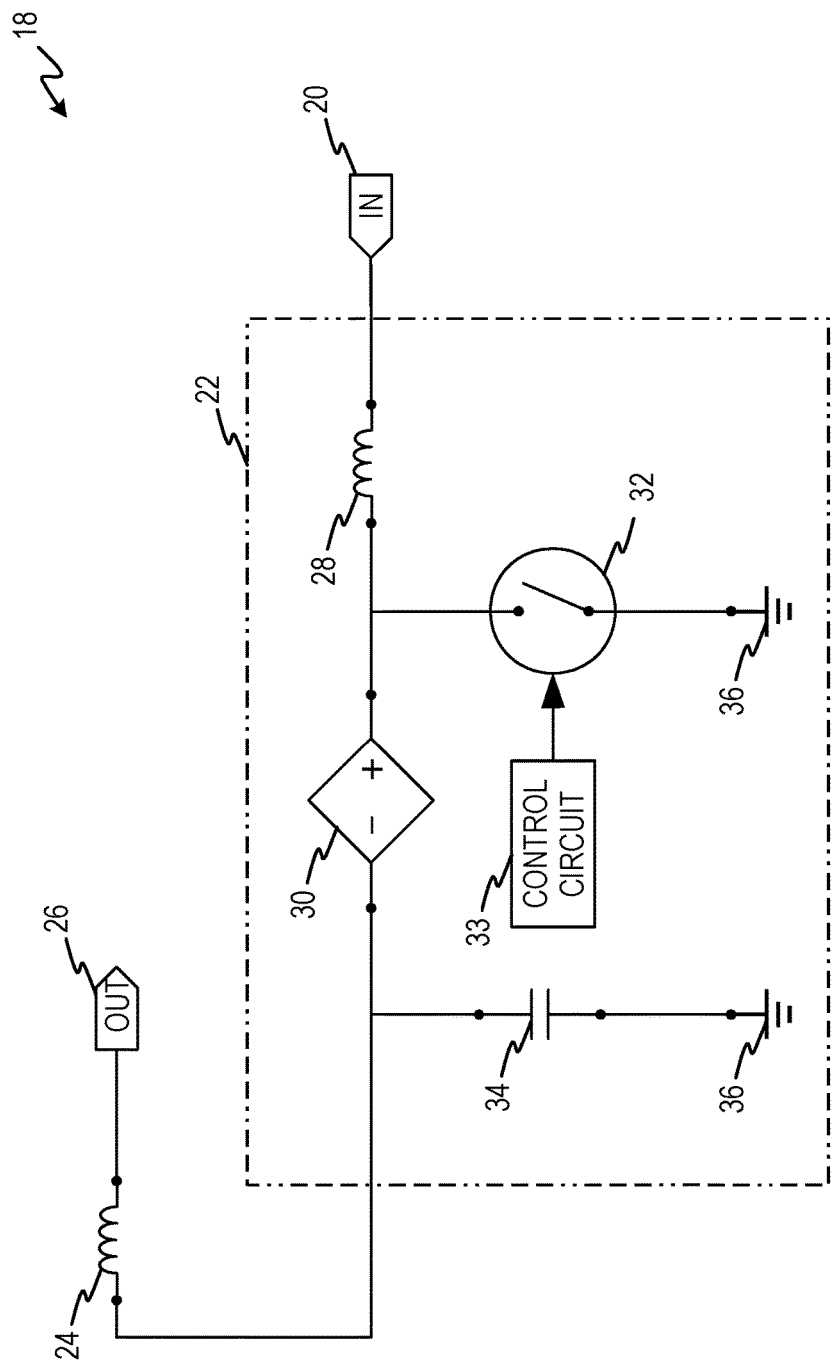
FIG. 2 is a schematic diagram of one example of a regenerative DC load.

FIG. 2 is a schematic diagram of one example of a regenerative DC load 18. Regenerative DC load 18 includes input 20, current regulating circuit 22, low pass filter circuit 24, and output 26. Current regulating circuit 22 includes inductive circuit 28, rectifier circuit 30, switch 32, control circuit 33, capacitive circuit 34, and ground 36.

Control circuit 33 is configured to open and close switch 32 to regulate the current received from an input device such as power distribution device 16 of FIG. 1. When switch 32 is closed, current will flow from input 20, through inductive circuit 28 and switch 32 to ground 36. Inductive circuit 28 can be an inductor, multiple inductors, or an arrangement of electrical components that behave similar to an inductor. While switch 32 is open, inductive circuit 28 will provide energy into capacitive circuit 34 by inducing a voltage reversal. While switch 32 is closed, rectifier circuit 30 prevents current from capacitive circuit 34 from flowing through rectifier circuit 30 and switch 32 to ground 36. Instead, capacitive circuit 34 will provide current to output 26 using energy stored as an electric field. Capacitive circuit 34 can be a capacitor, multiple capacitors, or an arrangement of electrical components that behave similar to a capacitor. Rectifier circuit 30 is configured to only allow current flow through itself towards capacitive circuit 34 or low pass filter circuit 24. In one example, rectifier circuit 30 is diode. In another example, rectifier circuit 30 is a switch controlled by control circuit 33. A switch can be a relay, a transistor, or other type of controllable switch. When rectifier circuit 30 is a switch, rectifier circuit 30 will be closed when switch 32 is open and rectifier circuit 30 will be open when switch 32 is closed.

When switch 32 is open, current flows through inductive circuit 28, rectifier circuit 30, low pass filter circuit 24, and to output 26. Also, while switch 32 is open, energy is stored in capacitor 34 as an electric field and energy is stored in inductive circuit 28 as a magnetic field. Inductive circuit 28 will resist a decrease in current from input 20 due to the increased resistance of current regulating circuit 22, by inducing a voltage across itself, using the energy stored as a magnetic field, to maintain the current. This also increases the voltage on capacitive circuit 34. Capacitive circuit 34 will store energy in an electric field based upon the voltage seen from inductive circuit 28 minus a small drop across rectifier circuit 30. The combination of inductive circuit 28, rectifier circuit 30, control circuit 33 and capacitive circuit 34 prevents extreme variances in current flow at any point in current regulating circuit 22.

The amount of current that flows through current regulating circuit 22 is controlled by characteristics of a cycle of switch 32, which is controlled by control circuit 33. The characteristics of the cycle include the duration of the cycle and the duty cycle. The duty cycle indicates how long switch 32 is open and closed during the cycle. The duration of the cycle determines how fast the switch opens and closes on average. The faster the cycle the less variation in current flow. During a single cycle switch 32 is open for a portion of the cycle and closed for a portion of the cycle. Increasing the portion of the cycle switch 32 is closed increases the current. Decreasing the portion of the cycle that switch 32 is closed decreases the current. The more time switch 32 is closed during a given time period, the higher the current from input 20 to output 26 will be.

Control circuit 33 is configured to monitor the input current and to control the cycle rate and the duty cycle of switch 32 to regulate the input current. The ability of control circuit 33 to monitor and regulate the input current allows the regenerative DC load to simulate various loads. Monitoring the current allows control circuit 33 to adjust the cycle rate and the duty cycle during operation based upon the actual current to maintain a desired current and load characteristics. In one example, control circuit 33 is an analog circuit. In another example, control circuit 33 is a microprocessor.

Low pass filter circuit 24 is configured to smooth out ripple current induced by switching of switch 32. In one example, low pass filter circuit 24 is an inductive circuit. Inductive circuits can be an inductor, multiple inductors, or an arrangement of electrical components that behave similar to an inductor. While capacitive circuit 34 has a smoothing effect on the current, in some examples, a greater degree of smoothing may be desired.

Figure 3:
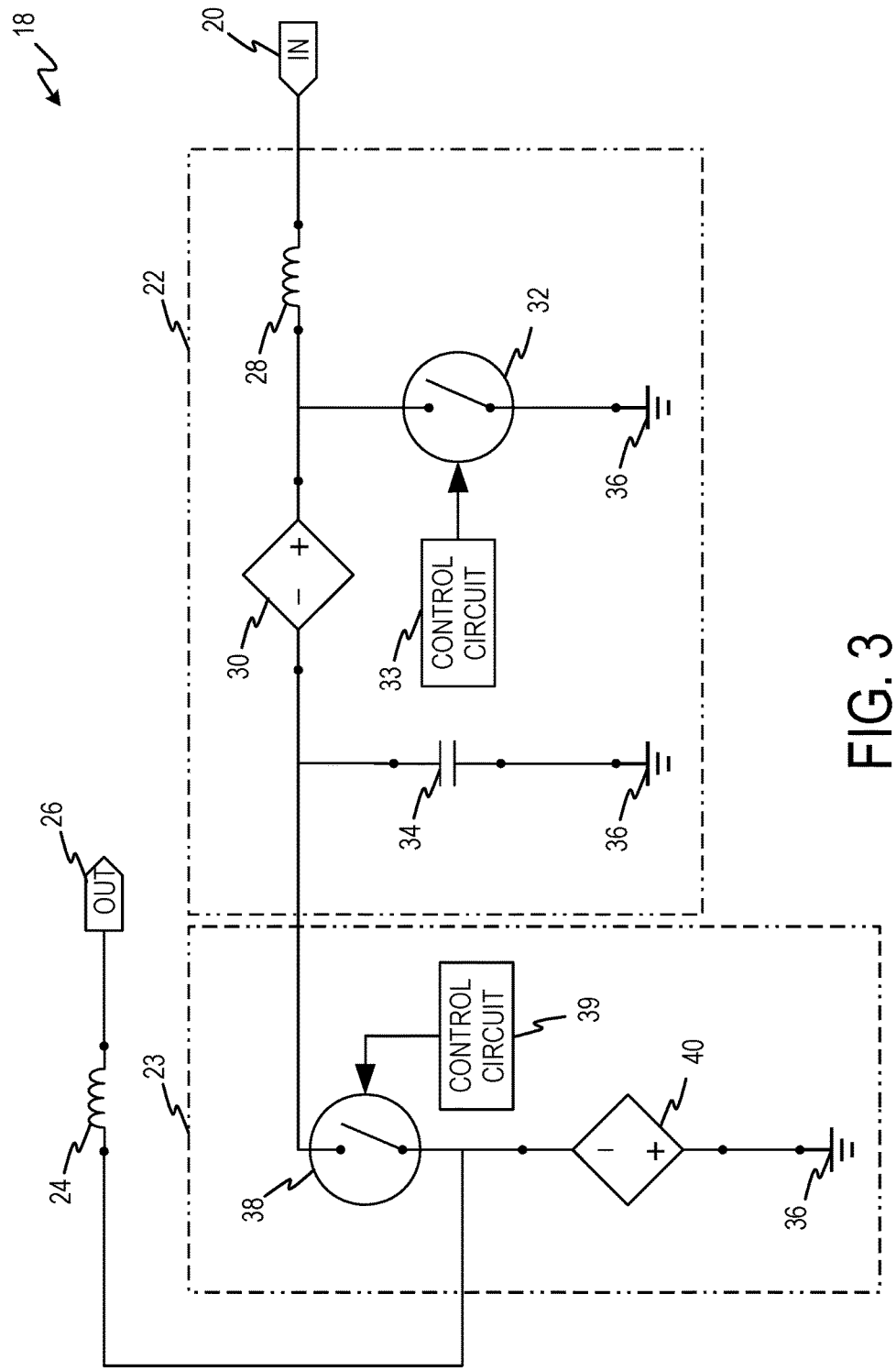
FIG. 3 is a schematic diagram of another example of a regenerative DC load.

FIG. 3 is a schematic diagram of another example of a regenerative DC load 18. In this example, regenerative DC load includes 18 includes input 20, current regulating circuit 22, link voltage regulating circuit 23, low pass filter circuit 24, and output 26. Current regulating circuit 22 includes inductive circuit 28, rectifier circuit 30, switch 32, control circuit 33, capacitive circuit 34, and ground 36. Link voltage regulating circuit 23 includes ground 36, switch 38, control circuit 39, and rectifier circuit 40.

Link voltage regulating circuit 23 regulates the voltage of capacitive circuit 34 from current regulating circuit 22. Current regulating circuit 22 is configured similarly to its configuration in FIG. 2. Capacitive circuit 34 sees a voltage higher than the input voltage at input 20. Capacitive circuit 34 helps to smooth out the ripple voltage caused by switch 32. Capacitive circuit 34 is most effective at smoothing out the ripple voltage when control circuit 39 regulates the voltage to approximately twice the input voltage 20, and synchronizes switch 38 to switch 32, which makes the current ripple in inductor circuit 28 approximately cancel the current ripple in inductor circuit 24, as seen by power supply 18. To increase the effectiveness of capacitive circuit 34, link voltage regulating circuit 23 regulates the voltage of capacitive circuit 34.

Link voltage regulating circuit 23 regulates the voltage of capacitive circuit 34 using switch 38, control circuit 39, and rectifier circuit 40. Low pass filter 24 has inductive qualities much like inductive circuit 28. While the switching of switch 32 increases the voltage of capacitive 34, switching of switch 38 lowers the voltage of capacitive circuit 34.

Control circuit 39 monitors the voltage of capacitive circuit 34 and adjusts switching of switch 38 accordingly. Closing switch 38 will cause the current flow to low pass filter circuit 24. Low pass circuit 34 will induce a voltage across itself in opposition to the current flow, lowering the voltage across capacitive circuit 34. Opening switch 38 will allow capacitive circuit 34 to maintain its current voltage or rise to the voltage induced by current regulating circuit 22. When switch 38 is closed, rectifier circuit 40 prevents current flowing from low pass filter circuit 24. Opening switch 38 causes a decrease in current to low pass filter circuit 24 causing the induced voltage to flip. By tying low pass filter 24 to ground with rectifier circuit 40, current flow is prevented from flowing backward allowing current to continuously increase to output 26. In one example control circuit 39 is an analog control circuit. In another example, control circuit 39 is a microcontroller. In a still further example, control circuit 33 and 39 are the same microcontroller.

Figure 4:
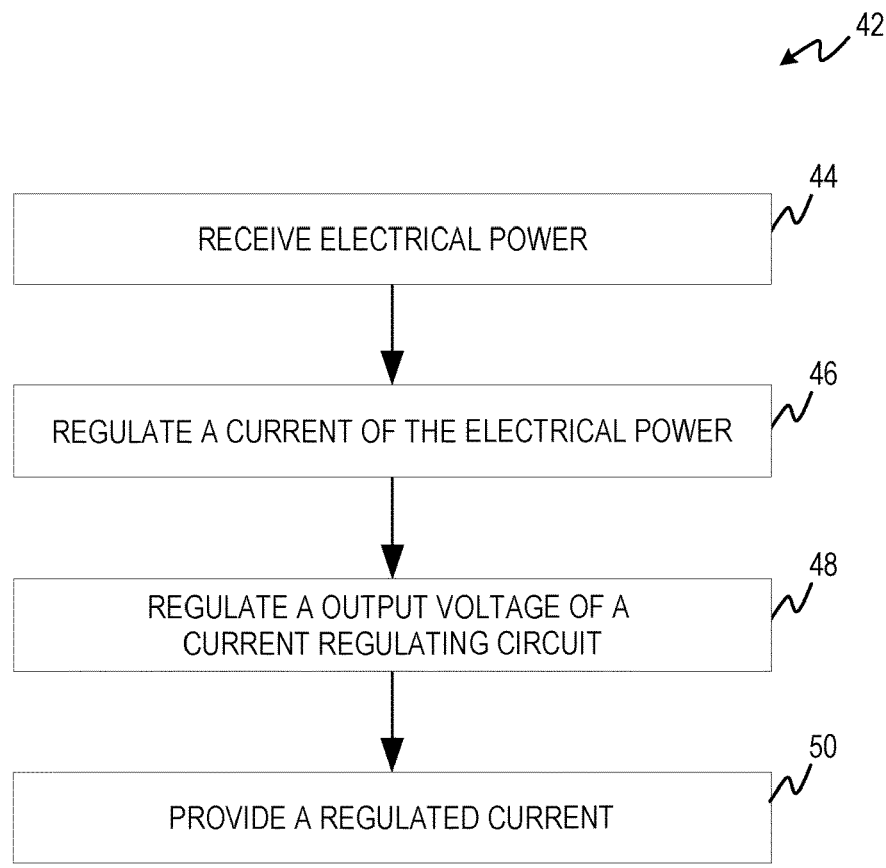
FIG. 4 is a flow diagram depicting a process for testing a power distribution device using regenerative DC load.

FIG. 4 is a flow diagram depicting process 42 for testing a power distribution device using regenerative DC load. For purposes of clarity and ease of discussion, the example operations are described below within the context of regenerative DC load 18 of FIG. 3.

At step 44, power is received from a power distribution device using input circuit 20. At step 46, the current of the electrical power is regulated using current regulating circuit 22. In one example, regulating the current includes sensing the current and adjusting a cycle duration and/or duty cycle of switch 32 based upon the sensed current. The current is sensed using control circuit 33. Control circuit 33 can use a shunt resistor or other sensor for sensing the current. The cycle duration and/or duty cycle of switch 32 is adjusted using control circuit 33. In a further example, regulating the current further includes a first set of sub-steps carried out in response to switch 32 closing, and a second set of sub-steps in response to switch 32 opening. The first set of sub-steps includes storing energy in a magnetic field, providing current, and preventing the provided current from flowing through switch 32 to ground 36. Inductive circuit 28 is used to store energy in a magnetic field. Capacitor 34 is used to provide the current. Rectifier circuit 30 is used to prevent the current from capacitor 34 flowing through closed switch 32 to ground 36. The second set of sub-steps includes inducing a voltage and storing energy. Inductive circuit 28 is used to induce a voltage. The induced voltage increases the voltage seen by capacitive circuit 34 over the voltage seen by input circuit 20. Energy is stored in an electric field using capacitive circuit 34.

At step 48, an output voltage of current regulating circuit 22 is regulated using link voltage regulating circuit 23. In one example, regulating the output voltage includes sensing the output voltage and adjusting a cycle duration and/or duty cycle of switch 38 based upon the sensed voltage. The voltage is sensed using control circuit 39. The cycle duration and/or duty cycle of switch 38 is adjusted using control circuit 39. In a further example, regulating the output voltage further includes preventing a current induced by low pass filter 24 from flowing to ground 36 using rectifier circuit 40. At step 50, a regulated current is provided to the power distribution device.

Accordingly, implementing techniques of this disclosure, regenerative DC loads can be utilized to test power distribution devices without consuming the power of a passive load. Using the regenerative DC loads described herein, a portion of the power provided to the regenerative DC loads can be provided back to power distribution devices. This allows the use of smaller power supplies as the current requirements for the power supplies is diminished. This also allows less power to be used, less heat to be generated, and less cooling be needed for power distribution device testing systems using the regenerative DC load described herein over passive load test systems.

DISCUSSION OF POSSIBLE EMBODIMENTS

The following are non-exclusive descriptions of possible embodiments of the present invention.

A regenerative direct current (DC) load can comprise an input circuit configured to receive electrical power; an output circuit configured to provide electrical power; a low pass filter circuit electrically coupled to the output in series; a current regulating circuit configured to regulate a current of the electrical power, the current regulating circuit electrically coupled to the input, the current regulating circuit can comprise a first switch electrically coupled between the input circuit and ground; a first control circuit configured to sense the current and adjust a cycle duration and/or duty cycle of the first switch based upon the sensed current; and a link voltage regulating circuit electrically coupled in series between the current regulating circuit and the low pass filter circuit, the link voltage regulating circuit configured to regulate a voltage received from the current regulating circuit, the link voltage regulating circuit comprising: a second switch electrically coupled in series between the current regulating circuit and the low pass filter circuit; and a second control circuit configured to sense the voltage received from the current regulating circuit and adjust a cycle duration and/or duty cycle of the second switch based upon the sensed voltage.

The regenerative DC load of the preceding paragraph can optionally include, additionally and/or alternatively, any one or more of the following features, configurations and/or additional components:

The current regulating circuit can further comprise an inductive circuit electrically coupled to the input circuit, the first switch electrically coupled between the first inductor and ground; a first rectifier circuit electrically coupled in series to the first inductor circuit; a capacitive circuit electrically coupled between the rectifier circuit and ground; and the link voltage regulating circuit further comprises a second rectifier circuit electrically coupled in series between the second switch and ground, the low pass filter circuit coupled in series between the output and a connection between the second switch and the second rectifier circuit.

The first rectifier circuit can be a third switch and the second rectifier circuit is a fourth switch.

The first, second, third, and fourth switches can be a metal-oxide-semiconductor field-effect transistor.

The first and second rectifiers can be diodes.

The first and second control circuit can be implemented using a single microcontroller.

The first control circuit can be configured to increases a time the first switch is closed in response to the sensed current being below a threshold current.

The second control circuit can be configured to increase a time the second switch is open per cycle in response to the sensed voltage being below a threshold voltage.

A system for regenerating power while testing a power distribution device can comprise a power distribution device; a power supply electrically coupled to the power distribution device, the power supply configured to provide power to the power distribution device; and a regenerative DC load electrically coupled to the power distribution device, the regenerative DC load configured to act as a load to the power distribution device and feed at least a portion of the power provided by the power distribution device back to the power distribution device, the regenerative DC load can comprise an input circuit configured to receive electrical power; an output circuit configured to provide electrical power; a low pass filter circuit electrically coupled to the output in series; and a current regulating circuit electrically coupled to the input circuit, the current regulating circuit comprising: a first switch electrically coupled between the input circuit and ground; and a first control circuit configured to sense the current and adjust a cycle duration and/or duty cycle of the first switch based upon the sensed current.

The system of the preceding paragraph can optionally include, additionally and/or alternatively, any one or more of the following features, configurations and/or additional components:

The regenerative DC load can further comprise a link voltage regulating circuit electrically coupled in series between the current regulating circuit and the low pass filter circuit, the link voltage regulating circuit configured to regulate a voltage received from the current regulating circuit, the link voltage regulating circuit comprising: a second switch electrically coupled in series between the current regulating circuit and the low pass filter circuit; and a second control circuit configured to sense the voltage received from the current regulating circuit and adjust a cycle duration and/or duty cycle of the second switch based upon the sensed voltage.

The current regulating circuit can further comprise an inductive circuit electrically coupled to the input, the first switch electrically coupled between the first inductor and ground; a first rectifier circuit electrically coupled in series to the first inductor circuit; a capacitive circuit electrically coupled between the rectifier circuit and ground; and the link voltage regulating circuit further comprises a second rectifier circuit electrically coupled in series between the second switch and ground, the low pass filter circuit coupled in series between the output and a connection between the second switch and the second rectifier circuit.

The first control circuit can be configured to increases a time the first switch is closed in response to the sensed current being below a threshold current.

The second control circuit can be configured to increase a time the second switch is open per cycle in response to the sensed voltage being below a threshold voltage.

The first and second switches can be transistors.

The first and second rectifier circuits can be diodes.

The first rectifier circuit can be a third switch; the first control circuit can be configured to open the third switch in response to closing the first switch and close the third switch in response to opening the first switch.

The first and second control circuits can be implemented using a single microcontroller.

The second control circuit can be configured to synchronize the switching of the second switch to the switching of the first switch.

A method for regenerating power while simulating a load of a power distribution device can comprise receiving electrical power at a voltage from a power distribution device; regulating, in response to receiving electrical power, the current of the electrical power received using a current regulating circuit, regulating the current can comprise sensing the current using a first control circuit, the first control circuit part of the current regulating circuit; adjusting, in response to the sensed current, a first switch cycle duration and/or duty cycle using the first control circuit; regulating, in response to the regulated current, an output voltage of the current regulating circuit using a link voltage regulating circuit, regulating the output voltage can comprise sensing the output voltage using a second control circuit, the second control circuit part of the link voltage regulating circuit; adjusting, in response to the sensed voltage, a second switch cycle duration and/or duty cycle using the second control circuit; and providing a regulated current to the power distribution device.

The method of the preceding paragraph can optionally include, additionally and/or alternatively, any one or more of the following features, configurations and/or additional components:

Regulating the current can further comprise, in response to the first switch closing, storing energy in a magnetic field using an inductive circuit; providing current using a capacitive circuit; and preventing the current from the capacitive circuit from flowing to ground through the first switch using a rectifier circuit; and in response to the first switch opening, inducing a voltage using the inductive circuit; and storing energy in an electric field using the capacitive circuit.

Regulating the output voltage of the current regulating circuit can further comprise preventing a current from the low pass filter circuit from flowing to ground using a rectifier circuit.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A regenerative direct current (DC) load comprising:
   an input circuit configured to receive electrical power;
   an output circuit configured to provide electrical power;
   a low pass filter circuit electrically coupled to the output in series;
   a current regulating circuit configured to regulate a current of the electrical power, the current regulating circuit electrically coupled to the input, the current regulating circuit comprising:
      a first switch electrically coupled between the input circuit and ground;
      a first control circuit configured to sense the current and adjust a cycle duration and/or duty cycle of the first switch based upon the sensed current; and
   a link voltage regulating circuit electrically coupled in series between the current regulating circuit and the low pass filter circuit, the link voltage regulating circuit configured to regulate a voltage received from the current regulating circuit, the link voltage regulating circuit comprising:
      a second switch electrically coupled in series between the current regulating circuit and the low pass filter circuit; and
      a second control circuit configured to sense the voltage received from the current regulating circuit and adjust a cycle duration and/or duty cycle of the second switch based upon the sensed voltage.

2. The regenerative DC load of claim 1, wherein:
   the current regulating circuit further comprises:

an inductive circuit electrically coupled to the input circuit, the first switch electrically coupled between the first inductor and ground;
a first rectifier circuit electrically coupled in series to the first inductor circuit;
a capacitive circuit electrically coupled between the rectifier circuit and ground; and
the link voltage regulating circuit further comprises a second rectifier circuit electrically coupled in series between the second switch and ground, the low pass filter circuit coupled in series between the output and a connection between the second switch and the second rectifier circuit.

3. The regenerative DC load of claim 1, wherein the first rectifier circuit is a third switch and the second rectifier circuit is a fourth switch.

4. The regenerative DC load of claim 3, wherein the first, second, third, and fourth switches are a metal-oxide-semiconductor field-effect transistor.

5. The regenerative DC load of claim 1, wherein the first and second rectifiers are diodes.

6. The regenerative DC load of claim 1, wherein the first and second control circuit are implemented using a single microcontroller.

7. The regenerative DC load of claim 1, wherein the first control circuit is configured to increases a time the first switch is closed in response to the sensed current being below a threshold current.

8. The regenerative DC load of claim 1, wherein the second control circuit is configured to increase a time the second switch is open per cycle in response to the sensed voltage being below a threshold voltage.

9. A system for regenerating power while testing a power distribution device comprising:
a power distribution device;
a power supply electrically coupled to the power distribution device, the power supply configured to provide power to the power distribution device; and
a regenerative DC load electrically coupled to the power distribution device, the regenerative DC load configured to act as a load to the power distribution device and feed at least a portion of the power provided by the power distribution device back to the power distribution device, the regenerative DC load comprising:
an input circuit configured to receive electrical power;
an output circuit configured to provide electrical power;
a low pass filter circuit electrically coupled to the output in series; and
a current regulating circuit electrically coupled to the input circuit, the current regulating circuit comprising:
a first switch electrically coupled between the input circuit and ground; and
a first control circuit configured to sense the current and adjust a cycle duration and/or duty cycle of the first switch based upon the sensed current.

10. The system of claim 9, wherein the regenerative DC load further comprises a link voltage regulating circuit electrically coupled in series between the current regulating circuit and the low pass filter circuit, the link voltage regulating circuit configured to regulate a voltage received from the current regulating circuit, the link voltage regulating circuit comprising:
a second switch electrically coupled in series between the current regulating circuit and the low pass filter circuit; and
a second control circuit configured to sense the voltage received from the current regulating circuit and adjust a cycle duration and/or duty cycle of the second switch based upon the sensed voltage.

11. The system of claim 10, wherein:
the current regulating circuit further comprises:
an inductive circuit electrically coupled to the input, the first switch electrically coupled between the first inductor and ground;
a first rectifier circuit electrically coupled in series to the first inductor circuit;
a capacitive circuit electrically coupled between the rectifier circuit and ground; and
the link voltage regulating circuit further comprises a second rectifier circuit electrically coupled in series between the second switch and ground, the low pass filter circuit coupled in series between the output and a connection between the second switch and the second rectifier circuit.

12. The system of claim 9, wherein the first control circuit is configured to increases a time the first switch is closed in response to the sensed current being below a threshold current.

13. The system of claim 10, wherein the second control circuit is configured to increase a time the second switch is open per cycle in response to the sensed voltage being below a threshold voltage.

14. The system of claim 10, wherein the first and second switches are transistors.

15. The system of claim 10, wherein the first and second rectifier circuits are diodes.

16. The system of claim 10, wherein:
the first rectifier circuit is a third switch;
the first control circuit is configured to open the third switch in response to closing the first switch and close the third switch in response to opening the first switch.

17. The system of claim 10, the first and second control circuits are implemented using a single microcontroller.

18. A method for regenerating power while simulating a load of a power distribution device comprising:
receiving electrical power at a voltage from a power distribution device;
regulating, in response to receiving electrical power, the current of the electrical power received using a current regulating circuit, regulating the current comprising:
sensing the current using a first control circuit, the first control circuit part of the current regulating circuit;
adjusting, in response to the sensed current, a first switch cycle duration and/or duty cycle using the first control circuit;
regulating, in response to the regulated current, an output voltage of the current regulating circuit using a link voltage regulating circuit, regulating the output voltage comprising:
sensing the output voltage using a second control circuit, the second control circuit part of the link voltage regulating circuit;
adjusting, in response to the sensed voltage, a second switch cycle duration and/or duty cycle using the second control circuit; and
providing a regulated current to the power distribution device.

19. The method of claim 18, wherein regulating the current further comprises:
in response to the first switch closing:
storing energy in a magnetic field using an inductive circuit;

providing current using a capacitive circuit; and
preventing the current from the capacitive circuit from flowing to ground through the first switch using a rectifier circuit; and in response to the first switch opening:
inducing a voltage using the inductive circuit; and
storing energy in an electric field using the capacitive circuit.

20. The method of claim 19, wherein regulating the output voltage of the current regulating circuit further comprises preventing a current from the low pass filter circuit from flowing to ground using a rectifier circuit.

* * * * *